J. Taggart,
Nine-Pin Ball,

Nº 24,893. Patented July 26, 1859.

Witnesses
Arthur Null
F P Hale Jr

Inventor
John Taggart

UNITED STATES PATENT OFFICE.

JNO. TAGGART, OF ROXBURY, MASSACHUSETTS.

NINE-PIN BALL.

Specification of Letters Patent No. 24,893, dated July 26, 1859.

*To all whom it may concern:*

Be it known that I, JOHN TAGGART, of Roxbury, in the county of Norfolk and State of Massachusetts, have invented a new or Improved Nine-Pin Ball, and do hereby declare that the same is fully described and represented in the following specification and the accompanying drawings, of which—

Figure 1:
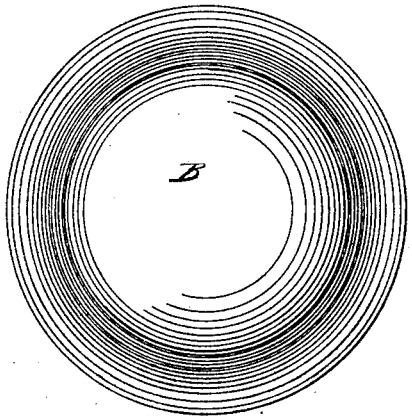
Figure 2:
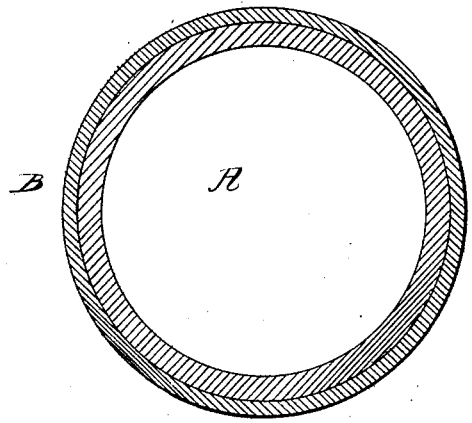

Figure 1, denotes an elevation, and Fig. 2, a vertical section of one of my improved nine-pin balls.

The balls now used on nine-pin alleys are constructed entirely of some hard wood such as lignum vitæ. To the use of such balls there are several serious objections. In the first place, the great noise attendant upon the rolling of them along the alley, is very unpleasant. In the second place the cost is very considerable. In the third place their density is so great that they soon wear or render the surface of the alley uneven.

In the construction of my improved ball I have sought for some means of remedying the above defects, as well as securing other advantages, and in carrying it out I cast or found a spherical shell of iron or other suitable metal and of any desirable size and thickness and cover the same in any proper manner with india-rubber or other suitable elastic material, such rubber coating being generally about one-fourth of an inch in thickness. A ball constructed in this manner not only moves over the alley with very little noise but it does not injure the alley
by moving over the same.

Another advantage which results from my invention is, that an alley for the use of such ball or balls so constructed can be made for one half the cost of an ordinary one.

Another advantage my ball possesses is that it may be made of any desirable size and the weight of it may be regulated at pleasure.

Having described my invention, I would remark that I do not claim a ball composed entirely or india rubber, but

What I do claim, is—

The new or improved article of manufacture or nine-pin ball, as composed of a hollow metallic body A, and a covering B, of india rubber, or other suitable elastic material the same being constructed and arranged in manner as hereinbefore set forth.

In testimony whereof I have hereunto set my signature this 10th day of June A. D. 1859.

JOHN TAGGART.

Witnesses:
   F. P. HALE, Jr.,
   LAURENCE LYONS.